(12) United States Patent
Zhang

(10) Patent No.: US 11,912,232 B2
(45) Date of Patent: Feb. 27, 2024

(54) SEAT BELT HEATING ASSEMBLY AND SEAT

(71) Applicant: LANGFANG GOLDEN TIME TECHNOLOGY DEVELOPMENT CO., LTD., Hebei (CN)

(72) Inventor: Haitao Zhang, Hebei (CN)

(73) Assignee: LANGFANG GOLDEN TIME TECHNOLOGY DEVELOPMENT CO., LTD., Hebei (CN)

( * ) Notice: Subject to any disclaimer, the term of this patent is extended or adjusted under 35 U.S.C. 154(b) by 384 days.

(21) Appl. No.: 17/295,957

(22) PCT Filed: Nov. 11, 2020

(86) PCT No.: PCT/CN2020/128190
§ 371 (c)(1),
(2) Date: May 21, 2021

(87) PCT Pub. No.: WO2021/115008
PCT Pub. Date: Jun. 17, 2021

(65) Prior Publication Data
US 2021/0309179 A1    Oct. 7, 2021

(30) Foreign Application Priority Data

Dec. 9, 2019  (CN) .......................... 201911251669.7
Dec. 9, 2019  (CN) .......................... 201911253157.4

(51) Int. Cl.
*B60R 22/12*     (2006.01)
*B60R 22/00*     (2006.01)
(Continued)

(52) U.S. Cl.
CPC ........... *B60R 22/12* (2013.01); *D03D 1/0005* (2013.01); *H05B 3/34* (2013.01); *B60R 2022/008* (2013.01)

(58) Field of Classification Search
CPC ... B60R 22/12; B60R 22/00; B60R 2022/008; D03D 1/0005; H05B 3/34
See application file for complete search history.

(56) References Cited

U.S. PATENT DOCUMENTS

| | | | |
|---|---|---|---|
| 4,370,784 A * | 2/1983 | Turnbull .............. | D03D 15/573 28/169 |
| 11,285,910 B2 * | 3/2022 | Niebling ................ | B60R 22/12 |
| 2008/0139066 A1 * | 6/2008 | Shimazaki .............. | B60R 22/12 442/189 |

FOREIGN PATENT DOCUMENTS

| | | |
|---|---|---|
| CN | 209600448 U | 11/2019 |
| CN | 110775013 A | 2/2020 |

(Continued)

OTHER PUBLICATIONS

PCT, International Search Report, Application No. PCT/CN2020/128190, dated Jan. 29, 2021, 5 pages.
(Continued)

*Primary Examiner* — Milton Nelson, Jr.
(74) *Attorney, Agent, or Firm* — Ziegler IP Law Group

(57) ABSTRACT

A seat-belt heating assembly and a seat are provided. The seat-belt heating assembly includes a safety belt body and a safety-belt heating mechanism. The safety belt heating mechanism connected to the safety belt body. The seat includes a safety belt body, a seat body, a heating component, and a control component. The heating component includes a heating mechanism provided in the safety belt body. In the use state, the heating mechanism has one end terminating in the safety belt body at the front end of the fixing member, and the other end terminating in the safety belt body at the front end of the retractor. The control component includes an ECU heating controller, a safety-belt heating switch, and an insertion detection unit configured to detect whether the latch is inserted into the buckle. Each of (Continued)

the safety-belt heating switch, the insertion detection unit, and the heating mechanism is connected to the ECU heating controller.

20 Claims, 4 Drawing Sheets

(51) Int. Cl.
*D03D 1/00* (2006.01)
*H05B 3/34* (2006.01)

(56) References Cited

FOREIGN PATENT DOCUMENTS

| | | | | |
|---|---|---|---|---|
| CN | 110775014 A | 2/2020 | | |
| CN | 211055091 U | 7/2020 | | |
| CN | 211107308 U | 7/2020 | | |
| DE | 102006011646 | * 9/2006 | ............. | B60R 22/12 |
| JP | 2015200036 A | 11/2015 | | |
| WO | 2018210905 A1 | 11/2018 | | |
| WO | 2018215195 A1 | 11/2018 | | |

OTHER PUBLICATIONS

PCT, Written Opinion of the International Searching Authority, Application No. PCT/CN2020/128190, dated Jan. 29, 2021, 5 pages.

\* cited by examiner

SEAT BELT HEATING ASSEMBLY AND SEAT

CROSS-REFERENCE TO RELATED APPLICATIONS

The present disclosure claims priority to Chinese Patent Application No. 201911253157.4, filed with the Chinese Patent Office on Dec. 9, 2019, entitled "Seat Belt Heating Assembly", and to Chinese Patent Application No. 201911251669.7, filed with the Chinese Patent Office on Dec. 9, 2019, entitled "Seat with Safety Belt Body Heating Mechanism", which are incorporated herein by reference in their entireties.

TECHNICAL FIELD

The present disclosure relates to a technology of safety belts, and in particular to a seat belt heating assembly and a seat.

BACKGROUND ART

The safety belt body is arranged on a seat as a basic protective device for protecting the driver or passenger during a car collision and is a safety part utilized in an apparatus. A conventional safety belt body is assembled mainly from a belt body made of raw materials polyester, polypropylene, or nylon and other components (a retractor, a buckle, and a latch tongue). Therefore, the safety belt body is greatly affected by the ambient temperature during use. In other words, in the case where the ambient temperature is relatively low, the belt body also has a relatively low temperature, resulting in that the user tends to have a feeling of discomfort when the use's hand or body touches the cold belt body.

SUMMARY

The aspects of the disclosed embodiments include, for example, providing a seat belt heating assembly and a seat, which offer a higher safety factor, provide a better touch feeling, and have a better appearance because a heating component is provided inside a safety belt body having a flat hollow structure and the heating component is not exposed to the outside.
Embodiments of the present disclosure are implemented as follows:

An embodiment of the present disclosure provides a seat belt heating assembly, comprising a safety belt body having two ends respectively connected to a retractor and to a fixing member and having a latch slidable thereon. The seat belt heating assembly of the present disclosure further includes a safety belt heating mechanism, including a heating control component and a heating component, wherein the heating component is fixed inside the safety belt body, and the safety belt body is integrated webbing having a flat hollow structure.

Optionally, the heating component is a resistive heating belt. The resistive heating belt includes a heating region, an isolation region, and a loop connection region. The isolation region is connected to the safety belt body.

Optionally, the resistive heating belt is formed by weaving warp and weft threads. The warp threads of the heating region consist of conductive warp threads and insulating warp threads arranged alternately at intervals. The weft threads of the heating region are insulating weft threads. The isolation region is formed by weaving insulating warp threads and insulating weft threads. The weft threads of the loop connection region at one end of the resistive heating belt include conductive weft threads and insulating weft threads arranged in an interlaced manner.

Optionally, the resistive heating belt further includes a first electrode and a second electrode. The isolation region divides the heating region into a first heating region and a second heating region independent of each other. The conductive warp threads of the first heating region are connected to the first electrode. The conductive warp threads of the second heating region are connected to the second electrode. Both the first electrode and the second electrode are power receiving terminals.

Optionally, there are at least two conductive warp threads connected to the first electrode.

Optionally, there are at least two conductive warp threads connected to the second electrode.

Optionally, both the conductive warp threads and the conductive weft threads are made of metallic threads, carbon fibers, composite coated fibers, or rewound threads composed of metallic threads and non-metallic threads.

Both the insulating warp threads and the insulating weft threads are made of nylon threads, polyester threads, cotton threads, aramid, or rayon.

Optionally, the isolation region has a width of 5 mm to 35 mm.

Optionally, an isolation region is provided on an outer side of the resistive heating belt in a width direction of the safety belt body.

Optionally, the isolation region is fixedly connected to an inner wall of the safety belt body on at least one side of the safety belt body in a thickness direction of the safety belt body.

Optionally, the isolation region is fixed to the safety belt body by means of sewing, soldering, or bonding.

Optionally, the safety belt body and the isolation region are fixedly connected to each other in form of being a whole, or in sections, or at spaced points.

Optionally, an insulating coating is provided on one or both sides of the resistive heating belt.

Optionally, the heating control component includes an electronic controller, a safety belt heating switch, a latch switch, and a seat occupancy sensor. The electronic controller, the safety belt heating switch, the latch switch, the seat occupancy sensor, and the heating component are connected in series.

The safety belt heating switch is configured to control an operating state of the heating component. The latch switch is configured to detect whether the latch is inserted into a buckle. The seat occupancy sensor is configured to detect whether an occupant is sitting on the seat body.

An embodiment of the present disclosure further provides a seat, comprising a seat body, a backrest, and a seat belt heating assembly. The backrest is connected to the seat body. The seat belt heating assembly is connected to the seat body.

An embodiment of the present disclosure further provides a seat, which is started to be heated by turning on the safety belt heating switch, inserting the latch of the safety belt body into the buckle, and controlling the heating mechanism to be powered on by the ECU heating controller, thereby improving the comfort of a user.

In order to achieve the above object, the present disclosure provides a seat, comprising: a safety belt body having two ends respectively connected to a retractor and to a fixing member and having a latch slidable thereon; and a seat body to which the fixing member and a buckle configured to allow the latch to be inserted when the safety belt body is used, are fixed.

The seat of the present disclosure further includes a safety belt heating device.

The safety belt heating device includes:

a heating component, including a heating mechanism provided in the safety belt body, the heating mechanism in a use state having one end terminating in the safety belt body at a front end of the fixing member and the other end terminating in the safety belt body at a front end of the retractor; and a control component, including an ECU heating controller, a safety belt heating switch, and an insertion detection unit configured to detect whether the latch is inserted into the buckle, each of the safety belt heating switch, the insertion detection unit, and the heating mechanism being connected to the ECU heating controller.

A lead wire is provided at an end of the safety belt body close to the fixing member, and the lead wire has one end connected to the heating mechanism and the other end at which a lead electrode is formed.

Optionally, the insertion detection unit is a latch switch placed inside the buckle.

Optionally, the control component further includes a temperature sensing unit. The temperature sensing unit is provided in the safety belt body at the front end of the fixing member.

The temperature sensing unit is a thermistor or a bimetal temperature sensor.

Optionally, the ECU heating controller is equipped therein with a timing program configured to record the time of heating by the heating mechanism.

Optionally, the safety belt body includes a belt body, which has an integrated flat hollow structure and in which the heating mechanism is provided.

At least one side of the inner wall of the belt body is fixedly connected to the heating mechanism.

Optionally, the belt body is sewn, bonded, riveted, or high-frequency welded to the heating mechanism.

Optionally, the heating mechanism is a resistive heating belt. The heating mechanism includes a base layer and a heating layer sandwiched inside the base layer or bonded to the exterior of the base layer.

Optionally, the heating mechanism is arranged in the safety belt body in sections or continuously.

Optionally, the seat of the present disclosure further includes a seat heating device.

The seat heating device includes a seat heating pad which is connected to the seat body; and a seat heating switch which is connected in series or in parallel to the safety belt heating switch.

Optionally, the seat is equipped with a seat occupancy detection mechanism. The seat occupancy detection mechanism is connected to the ECU heating controller and configured to detect whether an occupant is sitting on the seat body.

Compared with the prior art, the embodiments of the present disclosure include, for example, the following advantageous effects:

The seat belt heating assembly using the above structure according to the present disclosure offers a higher safety factor, provides a better touch feeling, and has a better appearance, because the heating component is provided inside a safety belt body having a flat hollow structure and the heating component is not exposed to the outside.

The seat with a safety belt body heating mechanism using the above structure according to the present disclosure is started to be heated by closing or turning on the safety belt heating switch, inserting the latch of the safety belt body into the buckle, and controlling the heating mechanism to be powered on by the ECU heating controller, thereby improving the comfort of a user.

The technical solutions of the present disclosure will be described in further detail below with reference to the accompanying drawings and embodiments.

BRIEF DESCRIPTION OF THE DRAWINGS

In order to more clearly illustrate the technical solutions of embodiments of the present disclosure, drawings required for use in the embodiments will be described briefly below. It is to be understood that the drawings below are merely illustrative of some embodiments of the present disclosure, and therefore should not be considered as limiting its scope. It will be understood by those of ordinary skill in the art that other relevant drawings can also be obtained from these drawings without any inventive effort.

Figure 1:
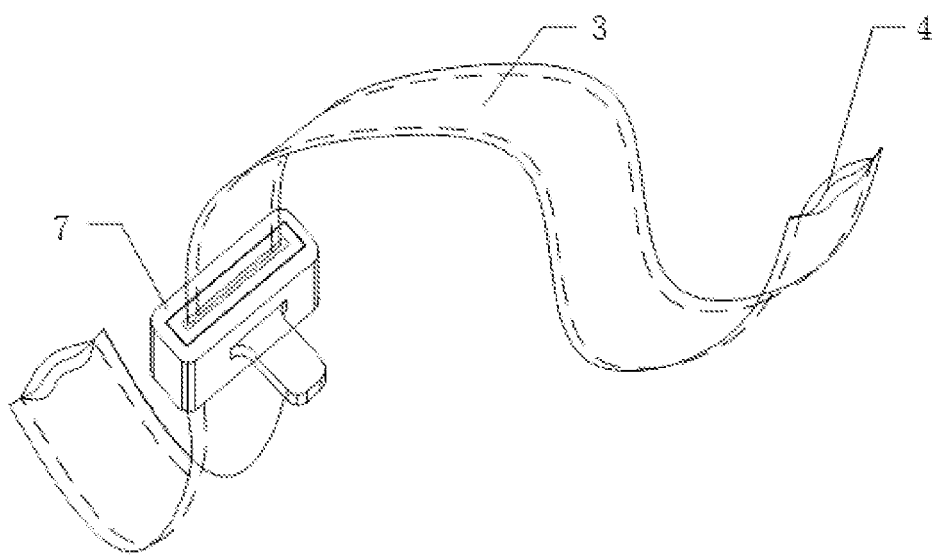
FIG. 1 is a schematic structural view of a seat belt body of a seat belt heating assembly according to an embodiment of the present disclosure.

In the above:

1—retractor; 2—guider; 3—safety belt body; 301—clamping layer; 4—heating mechanism; 5—fixing member; 6—lead electrode; 7—latch; 8—latch switch; 9—buckle; 10—backrest; 11—seat; 12—seat heating pad; 13—control component; 131—ECU heating controller; 132—safety belt heating controller; 133—seat occupancy detection mechanism; 134—insertion detection unit; 135—temperature sensing unit; 401—resistive heating belt; 40—heating region; 41—first heating region; 42—second heating region; 50—isolation region; 60—loop connection region; 71—conductive warp thread; 72—insulating warp thread; 81—insulating weft thread; 82—conductive weft thread; 91—first electrode; 92—second electrode.

DETAILED DESCRIPTION OF THE EMBODIMENTS

In order to further clarify the objects, technical solutions, and advantages of the embodiments of the present disclosure, the technical solutions of the embodiments of the present disclosure will be described below clearly and completely with reference to the drawings of the embodiments of the present disclosure. It is apparent that the embodiments to be described are some, but not all of the embodiments of the present disclosure. Generally, the components of the embodiments of the present disclosure, as described and illustrated in the figures herein, may be arranged and designed in a wide variety of different configurations.

Thus, the following detailed description of the embodiments of the present disclosure, as represented in the figures, is not intended to limit the scope of the present disclosure as claimed, but is merely representative of selected embodiments of the present disclosure. All the other embodiments obtained by those of ordinary skill in the art in light of the embodiments of the present disclosure without inventive efforts will fall within the scope of the present disclosure as claimed.

It should be noted that similar reference numerals and letters refer to similar items in the following figures, and thus once an item is defined in one figure, it may not be further defined or explained in the following figures.

In the description of the present disclosure, it should be noted that the terms such as "center", "up", "down", "left", "right", "vertical", "horizontal", "inside", and "outside", if present, indicate the orientation or positional relationships shown based on the figures, or the orientation or positional relationships in which the inventive product is conventionally placed in use, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure.

In addition, the terms such as "first", "second", and "third", if present, are used for distinguishing the description only, and should not be understood as an indication or implication of relative importance.

In addition, the term "horizontal", "vertical", "overhanging", or the like, if present, means that a component may be slightly inclined, rather than being required to be absolutely horizontal or overhanging. For example, by the term "horizontal", it is simply meant that its direction is more horizontal than the term "vertical", and it is not meant that the structure must be completely horizontal, but it is meant that the structure may be slightly inclined.

In the description of the present disclosure, it should also be noted that terms such as "arrange", "mount", "couple", and "connect", if present, should be understood broadly unless otherwise expressly specified or defined. For example, connection may be fixed connection or detachable connection or integral connection, may be mechanical connection or electric connection, or may be direct coupling or indirect coupling via an intermediate medium or internal communication between two elements. The specific meanings of the above-mentioned terms in the present disclosure can be understood by those of ordinary skill in the art according to specific situations.

It should be noted that the features in the embodiments of the present disclosure can be combined with each other without conflict.

Figure 2:
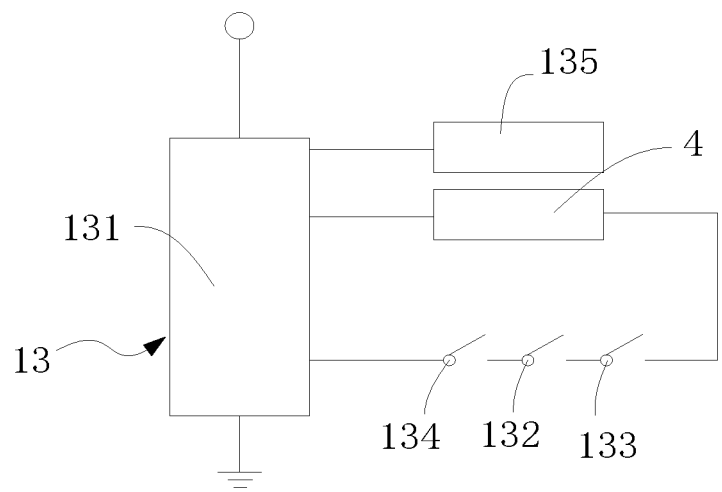
FIG. 2 is a schematic circuit view of a seat belt heating assembly according to an embodiment of the present disclosure.
Figure 3:
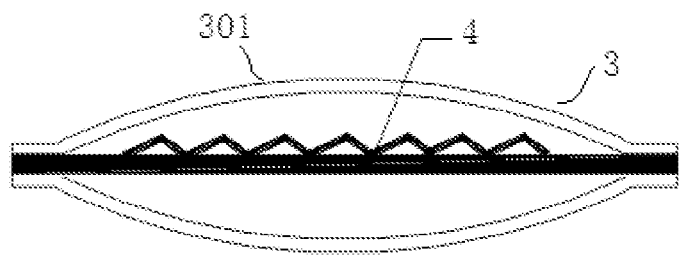
FIG. 3 is a structural view of a seat belt heating assembly according to an embodiment of the present disclosure when both sides of a heating component are connected to a safety belt body.
Figure 4:
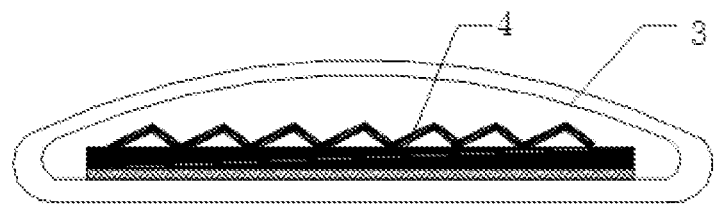
FIG. 4 is a structural view of a seat belt heating assembly according to an embodiment of the present disclosure when a single side of a heating component is connected to a safety belt body.
Figure 5:
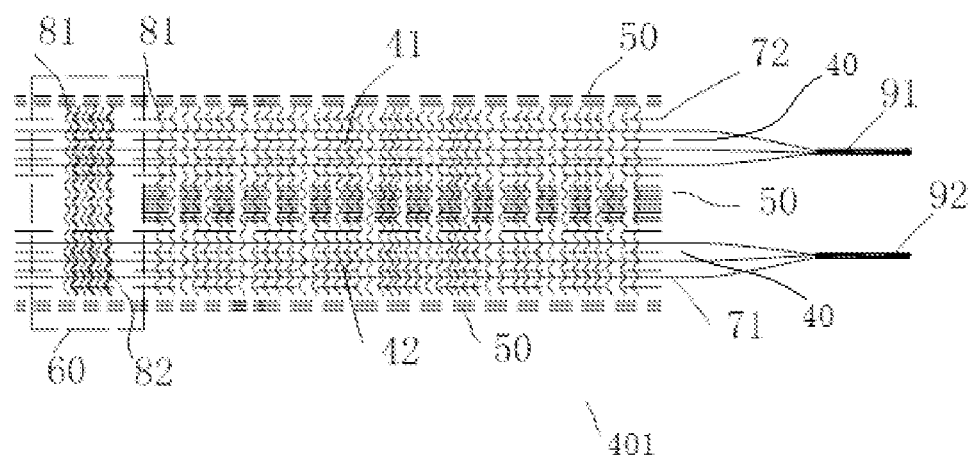
FIG. 5 is a schematic structural view of a resistive heating belt of a seat belt heating assembly according to an embodiment of the present disclosure.
Figure 6:
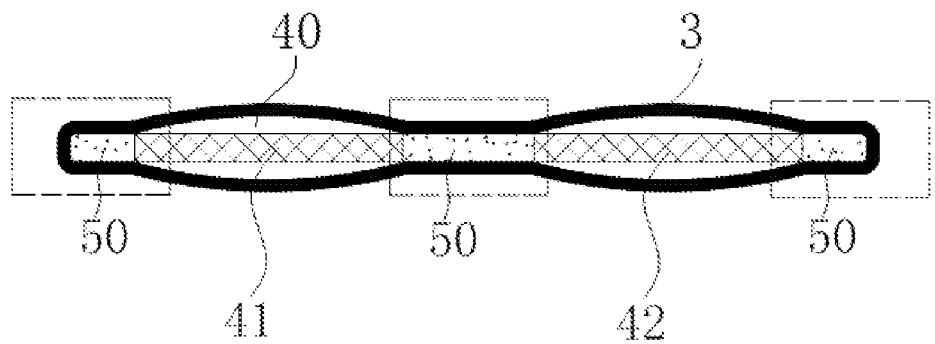
FIG. 6 is a schematic structural view of a modified structure of a resistive heating belt of a seat belt heating assembly according to an embodiment of the present disclosure.

FIG. 1 is a schematic structural view of a safety belt body of a seat belt heating assembly according to an embodiment of the present disclosure. FIG. 2 is a schematic circuit view of a seat belt heating assembly according to an embodiment of the present disclosure. FIG. 3 is a structural view of a seat belt heating assembly according to an embodiment of the present disclosure when both sides of a heating component are connected to a safety belt body. FIG. 4 is a structural view of a seat belt heating assembly according to an embodiment of the present disclosure when a single side of a heating component is connected to a safety belt body. FIG. 5 is a schematic structural view of a resistive heating belt of a seat belt heating assembly according to an embodiment of the present disclosure. It should be noted that, in FIG. 5, continuous lines of warp threads represent threads made of a conductive material, that is, conductive warp treads 71; broken lines of warp threads represent threads made of an insulating material, that is, insulating warp threads 72; the thinner lines of weft threads represent threads made of an insulating material, that is, insulating weft threads 81; thicker lines of weft threads represent threads made of a conductive material, that is, conductive weft threads 82, wherein the conductive warp threads 71 are used as a heating element of the resistive heating belt, and the interlaced woven relationship is not shown and the warp and weft threads are shown sparsely for the sake of clear illustration of the structure. FIG. 6 is a schematic structural view of a modified structure of a resistive heating belt of a seat belt heating assembly according to an embodiment of the present disclosure.

As shown in FIGS. 1, 2, 3, 4, 5, and 6, the seat belt heating assembly includes a safety belt body 3 and a safety belt heating mechanism.

Optionally, the safety belt body 3 has two ends connected to a retractor 1 and to a fixing member 5, respectively, and a latch 7 is slidably provided on the safety belt body 3. The safety belt heating mechanism includes a heating control component and a heating mechanism 4. The heating mechanism 4 is fixed inside the safety belt body 3. The heating mechanism 4 is configured to heat the safety belt body 3. Here, the heating mechanism 4 may also be referred to as a heating component.

Referring to FIG. 3, optionally, the safety belt body 3 includes two clamping layers 301. The heating mechanism 4 is clamped between the two clamping layers 301 of the safety belt body 3, and the two clamping layers 301 are fixedly connected at both ends of the safety belt body 3 in the extending direction thereof, so that no heating mechanism 4 is exposed in the extending direction of the safety belt body 3. In the width direction of the safety belt body 3, the heating mechanism 4 does not protrude from both sides in the width direction of the safety belt body 3. In other words, the heating mechanism 4 does not protrude from the safety belt body 3 in the width direction of the safety belt body 3. With such design, it can be ensured that the two sides of the heating mechanism 4 can be respectively connected to the two clamping layers 301 of the safety belt body 3 to improve the connection firmness, and the problem of poor appearance and reduced occupant experience due to exposure of the heating mechanism 4 from the safety belt body 3 can be avoided.

Referring to FIG. 4, in the present disclosure, optionally, the safety belt body 3 is integrated webbing having a flat hollow structure. Compared with a safety belt body that is folded and sewn, the safety belt body 3 involved in this embodiment has a chamber containing the heating mechanism 4 in its interior. In other words, the heating mechanism 4 is provided inside the safety belt body 3. In this way, the heating mechanism 4 is not exposed to the surface of the safety belt body 3, which gives a better appearance. When in use, the user is in direct contact with the safety belt body 3 and is unlikely to directly contact the heating mechanism 4, so that the safety belt body 3 provides a more comfortable touch feeling.

With continued reference to FIG. 4, one side of the heating mechanism 4 is fixedly connected to the safety belt body 3. It should be understood that the heating mechanism 4 may be fixedly connected to the safety belt body 3 on its both opposite sides to improve the strength of the connected structure.

Optionally, in the use state, the heating mechanism 4 has one end terminating in the safety belt body 3 at the front end of the fixing member 5, and the other end terminating in the safety belt body 3 at the front end of the retractor 1. It should be noted that the state of use of the heating mechanism 4 in this embodiment refers to a state where an occupant is sitting in the seat and wears the safety belt body 3, that is, a state where the latch 7 slidably provided on the safety belt body 3 is inserted into a buckle 9. In this state, the length of the safety belt body 3 pulled out of the retractor 1 is increased. While the safety belt body 3 is being pulled, the heating mechanism 4 is pulled out of the retractor 1 together with the safety belt body 3. In other words, the heating mechanism 4 is located outside the retractor 1, so that the retractor 1 is not affected during heating. It should be understood that the retractor 1 and the fixing member 5 may be fixed to the seat body 11 or to the vehicle body.

In other words, the length dimension of the heating mechanism 4 in the extending direction of the safety belt body 3 is smaller than the length dimension of the safety belt body 3. Thus, the heating mechanism 4 is made from less material with reduced cost.

Referring to FIG. 5, optionally, the heating mechanism 4 is a resistive heating belt 401. The resistive heating belt 401 includes a heating region 40, an isolation region 50, and a loop connection region 60. Specifically, the resistive heating belt 401 further includes a first electrode 91 and a second electrode 92. The isolation region 50 divides the heating region 40 into a first heating region 41 and a second heating region 42. The conductive warp threads 71 of the first heating region 41 are connected to the first electrode 91. The conductive warp threads 71 of the second heating region 42 are connected to the second electrode 92. Both the first electrode 91 and the second electrode 92 are power receiving terminals. Optionally, the ends of the first electrode 91 and the second electrode 92 are integrated with a plug, which is configured to be plugged and fitted into an electrical socket for receiving power.

Optionally, the isolation region 50 of the resistive heating belt 401 is constrained and fixed to the belt body at the upper and lower sides of the safety belt body 3 by at least one of the three methods of sewing, soldering, and bonding. It should be noted that the upper and lower sides of the safety belt body 3 are the two sides of the safety belt body 3 in the thickness direction thereof. In other words, the safety belt body 3 has a flat shape. The thickness direction of the safety belt body 3 is a direction perpendicular to a belt surface of the safety belt body 3 that is configured to be brought into contact with a human body. The safety belt body 3 has two belt surfaces. One of the belt surfaces is configured to be brought into contact with a human body, and the other belt surface faces away from the human body.

In this embodiment, the resistive heating belt 401 is fixedly connected to the safety belt body 3. When the occupant pulls the safety belt body 3, or when the occupant pulls the latch 7 so that the latch 7 slides on the safety belt body 3, the acting force acts directly on the safety belt body 3. When only the isolation region 50 of the resistive heating belt 401 is fixed to the safety belt body 3, the isolation region 50 is deformed with the stressed deformation of the safety belt body 3. Because the heating region 40 with the conductive warp threads 71 is not fixed to the safety belt body 3, the deformation force has been attenuated when transmitted to the heating region 40, which helps to protect the conductive warp threads 71, thereby helping to prolong the service life of the resistive heating belt 401.

Optionally, the safety belt body 3 and the isolation region 50 are fixedly connected to each other in form of being a whole, or in sections, or at spaced points. The isolation region 50 and the safety belt body 3 are fixed together, so that the first electrode 91 and the second electrode 92 are always kept to be in a spaced positional relationship, and the first electrode 91 and the second electrode 92 are wrapped in the safety belt body 3. The safety belt body 3 is made of an insulating material, which can prevent short circuiting of the first electrode 91 and the second electrode 92. In addition, an insulating protective layer may be provided on the exterior of each of the first electrode 91 and the second electrode 92, which has a better short-circuiting prevention effect.

It should be understood that the isolation region 50 may be in a constrained relationship to the safety belt body 3, and the heating region 40 may also be in a constrained relationship to the safety belt body 3. An isolation region 50 is also provided on an outer side of the resistive heating belt 401. The isolation region 50 is fixed to the belt body on both the upper and lower sides of the safety belt body 3, so that the conductive warp threads 71 connected correspondingly to the first electrode 91 and the second electrode 92 are completely isolated from each other and cannot contact each other, thereby preventing short circuiting of the first electrode 91 and the second electrode 92.

In other words, when the resistive heating belt 401 of the present disclosure is connected to the safety belt body 3, an isolation region 50 is provided in each of the middle part and both sides of the resistive heating belt 401, and the resistive heating belt 401 is fixed to the safety belt body 3 by means of all the three isolation regions 50, whereby a good fixing effect is obtained.

Optionally, the resistive heating belt 401 is formed by weaving warp and weft threads. The warp threads of the heating region 40 include conductive warp threads 71 and insulating warp threads 72 alternately arranged at intervals. The conductive warp threads 71 can be used as a heating element of the resistive heating belt 401. The insulating warp threads 72 of the heating region 40 separate the adjacent conductive warp threads 71 from each other to avoid short circuiting due to their contact with each other. The isolation region 50 is formed by weaving the insulating warp threads 72 and the insulating weft threads 81. The weft threads of the loop connection region 60 at one end of the resistive heating belt 401 include conductive weft threads 82 and insulating weft threads 81. The conductive weft threads 82 and the insulating weft threads 81 may be arranged alternately. It should be noted that the alternate arrangement of the warp threads described above does not necessarily mean that one conductive warp thread 71 and one insulating warp thread 72 are alternately arranged, and there may be several insulating warp threads 72 between adjacent conductive warp threads 71.

It should be noted that, in the present disclosure, the conductive warp threads 71 and the insulating warp threads 72 are alternately arranged in the width direction of the safety belt body 3; and the conductive weft threads 82 and the insulating weft threads 81 are alternately arranged in the length direction of the safety belt body 3.

Optionally, the isolation region 50 has a width of 5 mm to 35 mm, thereby preventing short circuiting of the first electrode 91 and the second electrode 92 due to contamination by sweat, electrolyte-containing drinks, or the like. Here, the width direction of the insulating region 50 is consistent with the width direction of the safety belt body 3.

For example, the width of the insulating region 50 may be 5 mm, 20 mm, 35 mm, or other values, which are not listed individually in the present disclosure, and can be set as required.

Optionally, both the conductive warp threads 71 and the conductive weft threads 82 are made of metallic threads, carbon fibers, composite coated fibers, rewound threads composed of metallic threads and non-metallic threads, or the like. Both the insulating warp threads 72 and the insulating weft threads 81 are made of nylon threads, polyester threads, cotton threads, aramid, rayon, or the like.

Optionally, the heating control component includes an electronic controller, a safety belt heating switch, a latch switch 8, and a seat occupancy detection mechanism. The electronic controller, the safety belt heating switch, the latch switch 8, the seat occupancy detection mechanism, and the heating mechanism 4 are connected in series in this order. In other words, the heating mechanism 4 is energized and the heating mechanism 4 can heat the safety belt body 3, only when a person is sitting in the seat and the latch 7 on the safety belt body 3 is inserted into the buckle and then the safety belt heating switch is turned on. This avoids waste of heat energy generated by the heating mechanism 4 activated into the heating state when no one is seated but the latch 7 is inserted into the buckle. Moreover, the electronic controller can also simultaneously control the seat to be heated. In other words, the electronic controller is connected to a seat heating pad 12 fixed to the seat, and the seat heating pad 12 is also controlled by the safety belt heating switch. In this way, the safety belt body 3 and the seat heating pad 12 can be simultaneously controlled by the heating control component to be in the heating state, with an easy operation.

Optionally, the electronic heating controller may be an ECU (electronic control unit) heating controller.

In addition, the heating control component may also be referred to as a control component. The seat occupancy detection mechanism may also be referred to as a seat occupancy sensor.

In other words, when an occupant is sitting in a corresponding seat, the seat occupancy detection mechanism in or on the corresponding seat detects the presence of the occupant, and the seat occupancy detection mechanism is activated. Further, when the occupant sitting in the seat inserts the latch 7 of the seat into the corresponding buckle 9, the latch switch 8 is activated. Then, when the safety belt heating switch is turned on, the heating mechanism 4 is energized and operates to heat the safety belt body 3.

Optionally, the conductive warp threads 71 located at one end of the first heating region 41 close to the fixing member 5 and the conductive warp threads 71 located at one end of the second heating region 42 close to the fixing member 5 are connected to the first electrode 91 and the second electrode 92, respectively. Both the first electrode 91 and the second electrode 92 may be metallic conductive wires with insulating coats, or other components that are conductive. For example, both the first electrode 91 and the second electrode 92 are power receiving terminals of the resistive heating belt 401. In other words, when the first electrode 91 and the second electrode 92 are metallic conductive wires, they may be connected to a terminal sheath and connected to a power source via the terminal sheath. The conductive warp threads 71 at the other end of the first heating region 41 and the conductive warp threads 71 at the other end of the second heating region 42 are connected via the loop connection region 60, and each of the electrodes is provided with at least two conductive warp threads 71, so that the magnitude of the resistance of the entire resistive heating belt 401 can be adjusted by changing at least one parameter selected from the resistance, length, or number of the conductive warp threads 71, so as to adjust the heating temperature.

It should be noted that the seat provided in this embodiment may be either used as a front seat (a seat in a first row), or used as a seat in a second or subsequent row, and the safety belt in this embodiment is a three-point safety belt. It should also be noted that the seat belt heating assembly and the retractor 1 may be fixed to the seat body 11 or to the vehicle body.

Therefore, the seat belt heating assembly according to the above embodiment of the present disclosure offers a higher safety factor, provides a better touch feeling, and has a better appearance, because the heating mechanism 4 is provided inside the safety belt body 3 having a flat hollow structure and the heating component 4 is not exposed to the outside.

This embodiment also provides a seat, which includes the seat belt heating assembly described above. The structure and operating principle of the seat are described as follows.

Figure 7:
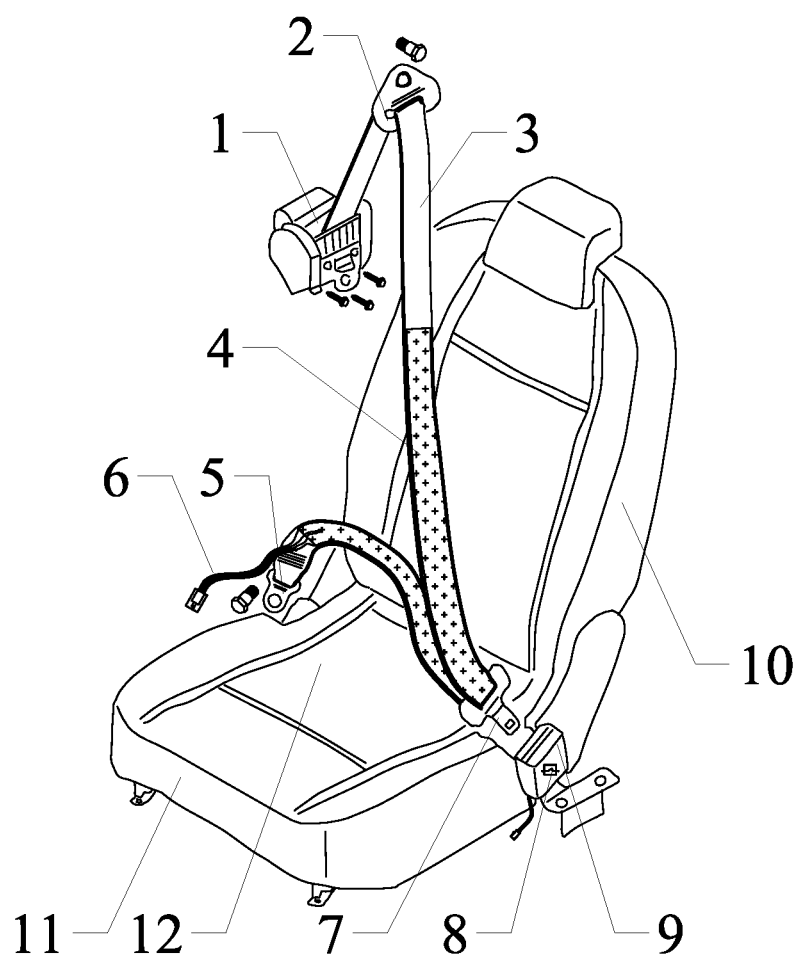
FIG. 7 is a schematic structural view of a seat according to an embodiment of the present disclosure.
Figure 8:
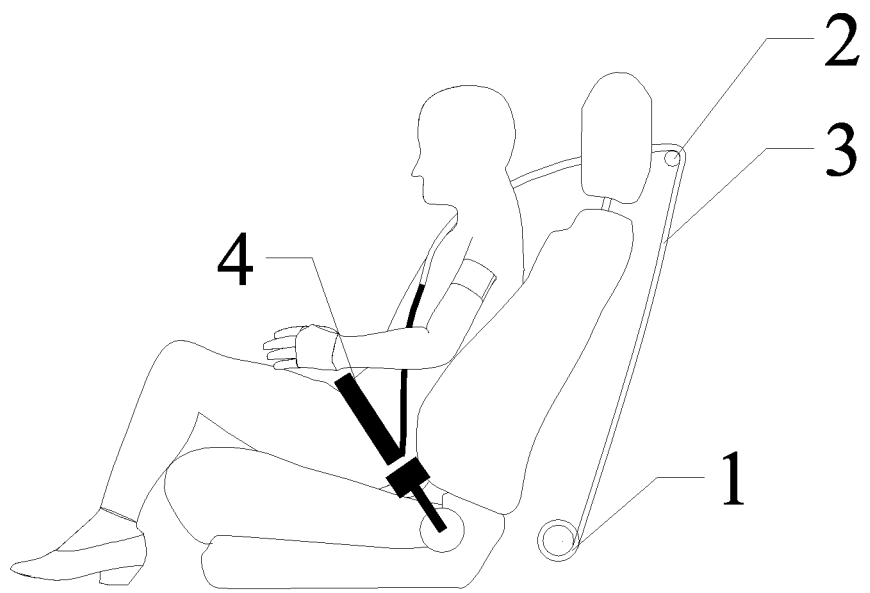
FIG. 8 is a view showing a state of use of a seat according to an embodiment of the present disclosure.
Figure 9:
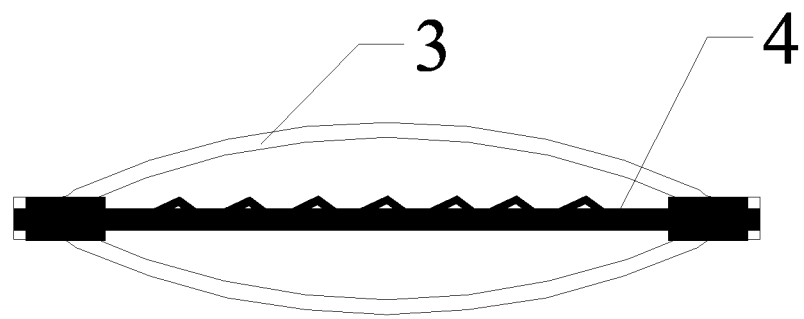
FIG. 9 is a schematic cross-sectional view of a safety belt body of a seat according to an embodiment of the present disclosure.

FIG. 7 is a schematic structural view of a seat according to an embodiment of the present disclosure. FIG. 8 is a view showing a state of use of a seat according to an embodiment of the present disclosure. FIG. 9 is a cross-sectional view of a safety belt body of a seat according to an embodiment of the present disclosure.

As shown in FIGS. 7 to 9, the seat of the present disclosure includes a seat body 11, a backrest 10, and a seat belt heating assembly. The backrest 10 is connected to the seat body 11. The seat belt heating assembly may be fixed to the seat body 11 or to the vehicle body.

Optionally, a fixing member 5 and a buckle 9 configured for allowing the latch 7 to be inserted when the safety belt body 3 is used, are fixed to the seat body 11.

The seat belt heating assembly includes a safety belt body 3, a heating mechanism 4, and a control component. The heating mechanism 4 is connected to the safety belt body 3 and configured to heat the safety belt body 3. The control component communicates with the heating mechanism 4 and is configured to activate or deactivate the heating mechanism 4.

In the present disclosure, the safety belt body 3 has two ends connected to the retractor 1 and to the fixing member 5, respectively, and the latch 7 is slidably provided on the safety belt body 3. Specifically, a guider 2 is provided on the rear side of the backrest 10. The latch 7 is slidably provided at an end of the safety belt body 3 passing through the guider 2.

Referring to FIG. 2, the control component 13 includes an ECU heating controller 131, a safety belt heating switch, and an insertion detection unit 134 configured to detect whether the latch 7 is inserted into the buckle 9. Optionally, the insertion detection unit 134 is a latch switch 8 placed inside the buckle 9. Obviously, the insertion detection unit 134 may further include a sensor configured to monitor the opened or closed state of the latch switch 8, such as a capacitance sensor or an image sensor. Optionally, the safety belt heating switch, the insertion detection unit 134, and the heating mechanism 4 are all connected in series with the ECU heating controller 131, and the ECU heating controller 131 is in an electrically connected relationship with the safety belt heating switch, the insertion detection unit 134, and the heating mechanism 4. In this way, the ECU heating controller 131 controls the heating mechanism 4 to start heating, when the ECU heating controller 131 detects that the safety belt heating switch is in a heating state and when the insertion detection unit 134 detects that the latch 7 is inserted into the buckle 9.

It can be seen from the above description that the start of the heating function of the heating mechanism 4 is restricted both by whether the latch 7 is inserted into the buckle 9 and by whether the safety belt heating switch is in the heating state. In other words, the safety belt heating switch and the latch switch 8 are in an "AND" relationship. Even if the safety belt heating switch is activated into the heating mode, the ECU heating controller 131 energizes the heating mechanism 4 to start a heating operation only when the latch 7 on the safety belt body 3 is inserted into the buckle 9 and then the ECU heating controller 131 receives a signal indicating the insertion of the latch 7 of the safety belt body 3 (the latch 7 is not inserted into the buckle 9 in the normal state, in which the latch switch 8 is in the normally closed state. Upon the latch 7 is inserted, the latch switch 8 is opened, and this changed state is transmitted to the ECU heating controller 131). Such a design can avoid a waste of energy caused by the heating mechanism 4 starting to heat the safety belt body 3 when the safety belt body 3 is not used or when it is unnecessary to heat the safety belt body 3.

Optionally, a lead wire is provided at an end of the safety belt body 3 close to the fixing member 5. The lead wire has one end connected to the heating mechanism 4, and the other end at which a lead electrode 6 is formed. The lead electrode 6 in this embodiment is configured to be electrically connected to a power supply interface. Optionally, the safety belt body 3 includes at least two lead wires electrically connected to the heating mechanism 4, so that the magnitude of the resistance of the lead wires can be changed by changing the number of the lead wires, so as to adjust the heating temperature output by the heating mechanism 4.

For example, there may be two lead electrodes 6. The two lead electrodes 6 may be the first electrode 91 and the second electrode 92, respectively.

In the present disclosure, optionally, the control component 13 further includes a temperature sensing unit 135 which is provided in the safety belt body 3 at the front end of the fixing member 5. The temperature sensing unit 135 is a thermistor or a bimetal temperature sensor. The temperature sensing unit 135 is connected to the ECU heating controller 131. The real-time temperature of the safety belt body 3 is detected and fed back to the ECU heating controller 131 by the temperature sensing unit 135, and then the heating temperature is controlled by using the ECU heating controller 131. In this way, the temperature is regulated more accurately to achieve temperatures required by different occupants, thereby providing a better experience to the occupants. For example, when the ambient temperature is 10° C., the heating function is automatically deactivated after preheating for 3 minutes. When the ambient temperature is 0° C., the heating function is automatically deactivated after preheating for 5 minutes. Alternatively, the ECU heating controller 131 is equipped therein with a timing program configured to record the time of heating by the heating mechanism 4. In other words, the ECU heating controller 131 also controls the heating by timing. The heating is timed for a total of 5 seconds to 10 minutes. At this time, a certain amount of heat has been accumulated in the safety belt heater and in the seat heater, and thus the ECU heating controller 131 automatically deactivates the heating function.

In the present disclosure, optionally, referring to FIG. 9, the safety belt body 3 is provided as an integrated flat hollow structure, and the heating mechanism 4 is provided in the safety belt body 3. At least one side of the inner wall of the safety belt body 3 is fixedly connected to the heating mechanism 4. Optionally, the safety belt body 3 can be fixedly connected to the heating mechanism 4 by sewing, bonding, riveting, or high-frequency welding.

For example, the inner wall of the safety belt body 3 has two opposite sides in its thickness direction. The heating mechanism 4 is provided between the two opposite sides of the safety belt body 3. The heating mechanism 4 is fixedly connected to both the opposite sides of the inner wall of the safety belt body 3, which results in high connection strength and a firm and reliable structure.

Optionally, the heating mechanism 4 is a resistive heating belt 401. The resistive heating belt 401 includes a base layer and a heating layer sandwiched inside the base layer or bonded to the exterior of the base layer. Moreover, the base layer is made of at least one of non-woven fabric, gauze, synthetic leather, leather, a foam pad, a plastic film, high-elastic sponge, EPDM, and PVC. The heating layer is a resistance wire arranged in a zigzag manner or a heating pad formed by weaving resistance wires and insulated wires.

Optionally, the heating mechanism 4 is arranged in the safety belt body 3 in sections or continuously. Bonding of the resistance wire(s) has higher efficiency as compared with the conventional fixing method.

In the present disclosure, optionally, the seat further includes a seat heating device.

The seat heating device includes a seat heating pad 12 and a seat heating switch. The seat heating pad 12 is provided in the seat body 11 and is configured to heat the seat body 11, thereby heating an occupant sitting on the seat body 11 to avoid sitting comfort being affected by an excessively low temperature of the seat body 11.

The seat heating switch is connected in series or in parallel to the safety belt heating switch. Two different control modes can be achieved by the series and parallel connections. Optionally, the seat heating switch and the safety belt heating switch may be integrated as one switch. The three modes of connection of the safety belt heating switch and the seat heating switch will be described below, respectively.

When the seat heating switch is connected in series with the safety belt heating switch, the seat heating switch and the safety belt heating switch are in an "AND" relationship, and the seat heating pad 12 and the heating mechanism 4 are brought into the heating state only when the seat heating switch and the safety belt heating switch are turned on simultaneously. In other words, the heating of the seat body 11 and the heating of the safety belt body 3 are controlled simultaneously. Moreover, in this case, the seat heating switch and the safety belt heating switch are controlled by a common controller. For example, both the seat heating switch and the safety belt heating switch are electrically connected to the ECU heating controller 131.

When the seat heating switch is connected in parallel to the safety belt heating switch, the seat heating switch and the safety belt heating switch are in an "OR" relationship. In other words, the operating states of the seat heating pad 12 and the heating mechanism 4 can be separately controlled by the seat heating switch and the safety belt heating switch. Moreover, in this case, the seat heating switch and the safety belt heating switch are separately controlled by two control circuits. Namely, the heating of the seat body 11 and the heating of the safety belt are controlled separately. Obviously, both the seat heating switch and the safety belt heating switch can be integrated on the ECU heating controller 131, as long as two independent control circuits are used.

A common switch is used as the seat heating switch and the safety belt heating switch. In this case, the heating of the seat body 11 and the heating of the seat belt 3 are controlled by a common controller so as to be simultaneously activated and simultaneously deactivated. It should be noted that the seat heating switch and the safety belt heating switch may be formed as an integrated switch provided on the ECU heating controller 131.

In the present disclosure, optionally, the seat body 11 is equipped with a seat occupancy detection mechanism 133. The seat occupancy detection mechanism 133 communicates with the ECU heating controller 131. In this embodiment, the seat occupancy detection mechanism 133 may be a membrane switch, a mechanical switch, a capacitive switch, or the like mounted in the area of the seat heating pad 12. Optionally, the seat occupancy detection mechanism 133, the seat heating switch, and the safety belt heating switch are arranged in series, so that the seat heating pad 12 and the safety belt body 3 will be heated and brought into a heated state simultaneously only when the seat occupancy detection mechanism 133 detects that an occupant is sitting on the seat body 11 and both the seat heating switch and the safety belt heating switch are turned on. This avoids waste of heat energy generated by the heating mechanism 4 activated into the heating state when no one is seated but the latch 7 is inserted into the buckle 9.

It should be noted that the seat provided in this embodiment may be either used as a front seat (a seat in a first row), or used as a seat in a second or subsequent row, and the safety belt in this embodiment is a three-point safety belt.

Therefore, the seat using the above structure according to the present disclosure is started to be heated by closing or turning on the safety belt heating switch, inserting the latch 7 of the safety belt body 3 into the buckle 9, and controlling the heating mechanism to be powered on by the ECU heating controller 131, thereby improving the comfort of a user.

Finally, it should be noted that the above embodiments are merely intended to illustrate the technical solutions of the present disclosure, but not intended to limit the present disclosure. Although the present disclosure has been described in detail with reference to preferred embodiments, it should be understood by those of ordinary skill in the art that the technical solutions of the present disclosure may still be modified or replaced with equivalents. Such modifications or equivalent replacements will not cause the modified technical solutions to depart from the spirit and scope of the technical solutions of the present disclosure.

INDUSTRIAL APPLICABILITY

In summary, the present disclosure provides a seat belt heating assembly and a seat, which offer a high safety factor and a good experience.

The invention claimed is:

1. A seat belt heating assembly, comprising a safety belt body having two ends respectively connected to a retractor and to a fixing member and having a latch slidable thereon, further comprising a safety belt heating mechanism including a heating control component and a heating component, wherein the heating component is fixed inside the safety belt body, and the safety belt body is an integrated webbing in a flat hollow structure, wherein the heating component is a resistive heating belt and the resistive heating belt comprises a heating region, an isolation region, and a loop connection region; and the isolation region is connected to the safety belt body.

2. The seat belt heating assembly according to claim 1, wherein the heating control component comprises an electronic controller, a safety belt heating switch, a latch switch, and a seat occupancy sensor, wherein the electronic controller, the safety belt heating switch, the latch switch, the seat occupancy sensor, and the heating component are connected in series; and the safety belt heating switch is configured to control an operating state of the heating component; the latch switch is configured to detect whether the latch is inserted into a buckle; and the seat occupancy sensor is configured to detect whether an occupant is sitting on the seat body.

3. The seat belt heating assembly according to claim 1, wherein the resistive heating belt is formed by weaving warp and weft threads, the warp threads of the heating region consist of conductive warp threads and insulating warp threads arranged alternately at intervals, the weft threads of the heating region are insulating weft threads, the isolation region is formed by weaving insulating warp threads and insulating weft threads, and the weft threads of the loop connection region at one end of the resistive heating belt comprise conductive weft threads and insulating weft threads arranged in an interlaced manner.

4. The seat belt heating assembly according to claim 3, wherein the resistive heating belt further comprises a first electrode and a second electrode, the isolation region divides the heating region into a first heating region and a second heating region independent of each other, the conductive warp threads of the first heating region are connected to the first electrode, the conductive warp threads of the second heating region are connected to the second electrode, and both the first electrode and the second electrode are power receiving terminals.

5. The seat belt heating assembly according to claim 4, wherein both the conductive warp threads and the conductive weft threads are made of metallic threads, carbon fibers, composite coated fibers, or rewound threads composed of metallic threads and non-metallic threads; and both the insulating warp threads and the insulating weft threads are made of nylon threads, polyester threads, cotton threads, aramid, or rayon.

6. The seat belt heating assembly according to claim 1, wherein an insulating coating is provided on one or both sides of the resistive heating belt.

7. The seat belt heating assembly according to claim 1, wherein the isolation region has a width of 5 mm to 35 mm.

8. The seat belt heating assembly according to claim 1, wherein an isolation region is provided on an outer side of the resistive heating belt in a width direction of the safety belt body.

9. The seat belt heating assembly according to claim 1, wherein the isolation region is fixedly connected to at least one side of an inner wall of the safety belt body in a thickness direction of the safety belt body.

10. The seat belt heating assembly according to claim 9, wherein the isolation region is fixed to the safety belt body by sewing, soldering, bonding, riveting, or high-frequency welding.

11. The seat belt heating assembly according to claim 1, wherein the safety belt body and the isolation region are fixedly connected to each other in form of being a whole, or in sections, or at spaced points.

12. A seat, comprising:
a seat body, a backrest, and the seat belt heating assembly according to claim 1, wherein the backrest is connected to the seat body, and the seat belt heating assembly is connected to the seat body.

13. A seat, comprising:
a safety belt body having two ends respectively connected to a retractor and to a fixing member and having a latch slidable thereon; and
a seat body to which the fixing member and a buckle are fixed, the buckle being configured to allow the latch to be inserted thereinto when the safety belt body is used;
wherein the seat further comprises a safety belt heating device,
wherein the safety belt heating device comprises:
a heating component, comprising a heating mechanism provided in the safety belt body, wherein the heating mechanism is configured to have, when in a use state, one end terminating in the safety belt body at a front end of the fixing member and the other end terminating in the safety belt body at a front end of the retractor; and
a control component, comprising an ECU heating controller, a safety belt heating switch, and an insertion detection unit configured to detect whether the latch is inserted into the buckle, each of the safety belt heating switch, the insertion detection unit, and the heating mechanism being connected to the ECU heating controller,
wherein a lead wire is provided at an end of the safety belt body close to the fixing member, and the lead wire has one end connected to the heating mechanism and the other end at which a lead electrode is formed.

14. The seat according to claim 13, further comprising a seat heating device,
wherein the seat heating device comprises a seat heating pad which is connected to the seat body; and
a seat heating switch which is connected in series or in parallel to the safety belt heating switch.

15. The seat according to claim 14, wherein the seat is equipped with a seat occupancy detection mechanism which is connected to the ECU heating controller and configured to detect whether an occupant is sitting on the seat body.

16. The seat according to claim 13, wherein the insertion detection unit is a latch switch placed inside the buckle.

17. The seat according to claim 16, wherein the control component further comprises a temperature sensing unit, and the temperature sensing unit is provided in the safety belt body at the front end of the fixing member; and
the temperature sensing unit is a thermistor or a bimetal temperature sensor.

18. The seat according to claim 13, wherein the heating mechanism is a resistive heating belt, and the heating mechanism comprises a base layer and a heating layer sandwiched inside the base layer or bonded to an exterior of the base layer.

19. The seat according to claim 13, wherein the heating mechanism is arranged in the safety belt body in sections or continuously.

20. The seat according to claim 13, wherein the control component further comprises a temperature sensing unit, and the temperature sensing unit is provided in the safety belt body at the front end of the fixing member; and
the temperature sensing unit is a thermistor or a bimetal temperature sensor.

* * * * *